(12) United States Patent
Chandra et al.

(10) Patent No.: US 10,509,772 B1
(45) Date of Patent: *Dec. 17, 2019

(54) EFFICIENT LOCKING OF LARGE DATA COLLECTIONS

(71) Applicant: Google LLC, Mountain View, CA (US)

(72) Inventors: Tushar Deepak Chandra, Los Altos, CA (US); Tal Shaked, Los Altos, CA (US); Yoram Singer, Palo Alto, CA (US); Tze Way Eugene Ie, San Mateo, CA (US); Joshua Redstone, Cambridge, MA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,071

(22) Filed: Dec. 28, 2016

Related U.S. Application Data

(63) Continuation of application No. 14/101,611, filed on Dec. 10, 2013, now Pat. No. 9,569,481.

(51) Int. Cl.
*G06F 7/00* (2006.01)
*G06F 16/176* (2019.01)
*G06F 16/23* (2019.01)

(52) U.S. Cl.
CPC ........ *G06F 16/1774* (2019.01); *G06F 16/235* (2019.01)

(58) Field of Classification Search
None
See application file for complete search history.

(56) References Cited

U.S. PATENT DOCUMENTS

| 5,335,346 | A | | 8/1994 | Fabbio |
| 5,806,074 | A | | 9/1998 | Souder |
| 5,832,484 | A | * | 11/1998 | Sankaran ............ G06F 16/2343 |
| 5,987,472 | A | | 11/1999 | Serafin |
| 6,138,112 | A | | 10/2000 | Slutz |
| 6,374,263 | B1 | | 4/2002 | Bunger |
| 6,487,552 | B1 | | 11/2002 | Lei |
| 6,606,626 | B1 | * | 8/2003 | Ponnekanti ......... G06F 16/2308 |
| 6,631,371 | B1 | | 10/2003 | Lei |
| 7,099,879 | B2 | | 8/2006 | Tacaille |

(Continued)

OTHER PUBLICATIONS

Gruber, "Optimism vs. Locking: a Study of Concurrency Control for Client-Sewer Object-Oriented Databases," Technical Report, Massachusetts Institute of Technology, Feb. 1997, 173 pages.

(Continued)

*Primary Examiner* — Daniel A Kuddus
(74) *Attorney, Agent, or Firm* — Fish & Richardson P.C.

(57) ABSTRACT

The present disclosure provides systems and techniques for efficient locking of datasets in a database when updates to a dataset may be delayed. A method may include accumulating a plurality of updates to a first set of one or more values associated with one or more features. The first set of one or more values may be stored within a first database column. Next, it may be determined that a first database column update aggregation rule is satisfied. A lock assigned to at least a portion of at least a first database column may be acquired. Accordingly, one or more values in the first set within the first database column may be updated based on the plurality of updates. In an implementation, the first set of one or more values may be associated with the first lock.

20 Claims, 3 Drawing Sheets

(56) References Cited

U.S. PATENT DOCUMENTS

| | | | |
|---|---|---|---|
| 7,139,749 B2 | 11/2006 | Bossman | |
| 7,149,736 B2 | 12/2006 | Chkodrov | |
| 7,181,452 B1* | 2/2007 | Luo | G06F 17/30457 |
| 7,480,653 B2* | 1/2009 | Cornwell | G06F 16/2343 |
| 7,689,560 B2* | 3/2010 | Barabas | G06F 9/46 |
| | | | 707/999.008 |
| 7,890,482 B2* | 2/2011 | Cornwell | G06F 16/2343 |
| | | | 707/704 |
| 8,489,567 B2* | 7/2013 | Barabas | G06F 9/46 |
| | | | 707/704 |
| 8,782,100 B2 | 7/2014 | Yoon | |
| 9,189,536 B2* | 11/2015 | Barabas | G06F 16/278 |
| 9,239,858 B1* | 1/2016 | Willeford | G06F 16/2365 |
| 9,672,231 B2* | 6/2017 | Vermette | G06F 21/6218 |
| 2002/0116364 A1 | 8/2002 | Seki | |
| 2003/0004945 A1* | 1/2003 | Teng | G06F 16/2343 |
| 2003/0018644 A1 | 1/2003 | Bala | |
| 2004/0267807 A1* | 12/2004 | Barabas | G06F 9/46 |
| 2005/0125325 A1* | 6/2005 | Chai | G06F 17/30457 |
| | | | 705/35 |
| 2005/0192921 A1 | 9/2005 | Chaudhuri | |
| 2005/0192988 A1 | 9/2005 | Barsness | |
| 2005/0262108 A1 | 11/2005 | Gupta | |
| 2008/0010283 A1* | 1/2008 | Cornwell | G06F 16/2343 |
| 2010/0235335 A1 | 9/2010 | Heman | |
| 2011/0119226 A1 | 5/2011 | Ruhl | |
| 2011/0295678 A1 | 12/2011 | Seldin | |
| 2012/0233287 A1 | 9/2012 | Queru | |
| 2015/0178278 A1 | 6/2015 | Finkelstein | |
| 2016/0253382 A1* | 9/2016 | Shadmon | G06F 16/2453 |
| | | | 707/718 |

OTHER PUBLICATIONS

Huang and Stankovic, "Concurrency Control in Real-Time Database Systems: Optimistic Scheme vs. Two-Phase Locking," COINS Technical Report, University of Massachusetts, Jul. 1990, 21 pages.

Resende et al., "Semantic Locking in Object-Oriented Database Systems," Proceedings of the ninth annual conference on Object-oriented programming systems, language, and applications, Oct. 1994, 388-402.

Gottemukkala and Lehman, "Locking and Latching in a Memory-Resident Database System," Proceedings of the 18th International Conference on Very Large Data Bases, 1992, 533-544.

Singhal and Smith, "Analysis of locking behavior in three real database systems," The VLDB Journal (1997) 6: 40-52.

* cited by examiner

EFFICIENT LOCKING OF LARGE DATA COLLECTIONS

CROSS-REFERENCE TO RELATED APPLICATIONS

This application is a continuation of U.S. application Ser. No. 14/101,611, filed on Dec. 10, 2013.

BACKGROUND

Large-scale data processing may include extracting data of interest from raw data in one or more databases and processing it into a data product. These databases may store a vast number of datasets and values in each dataset. Typically, locks may be implemented in these databases. A lock, such as a read lock or write lock, may be used when multiple users need to access a database concurrently. The lock may prevent data from being corrupted or invalidated, for example, when multiple users try to read while others write to the database.

BRIEF SUMMARY

According to an implementation of the disclosed subject matter, a method may include accumulating a plurality of updates to a first set of one or more values associated with one or more features. The first set of one or more values may be stored within a first database column. Next, it may be determined that a first database column update aggregation rule is satisfied. A lock assigned to at least a portion of at least a first database column may be acquired. Accordingly, one or more values in the first set within the first database column may be updated based on the plurality of updates.

An implementation of the disclosed subject matter provides a system including a processor configured to accumulate a plurality of updates to a first set of one or more values associated with one or more features. The first set of one or more values may be stored within a first database column. It may be determined that a first database column update aggregation rule is satisfied. A first lock assigned to at least a portion of at least a first database column may be acquired. Next, one or more values in the first set within the first database column may be updated based on the plurality of updates.

Implementations of the disclosed subject matter provide methods and systems that allow for efficient locking of datasets in a database by delaying updates to values in a dataset. Because locking is typically more expensive than accessing a numerical value from RAM, locking can dominate the overall cost of a computation if used indiscriminately. By reducing the overhead cost of locking, the overall performance of such systems may be improved. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
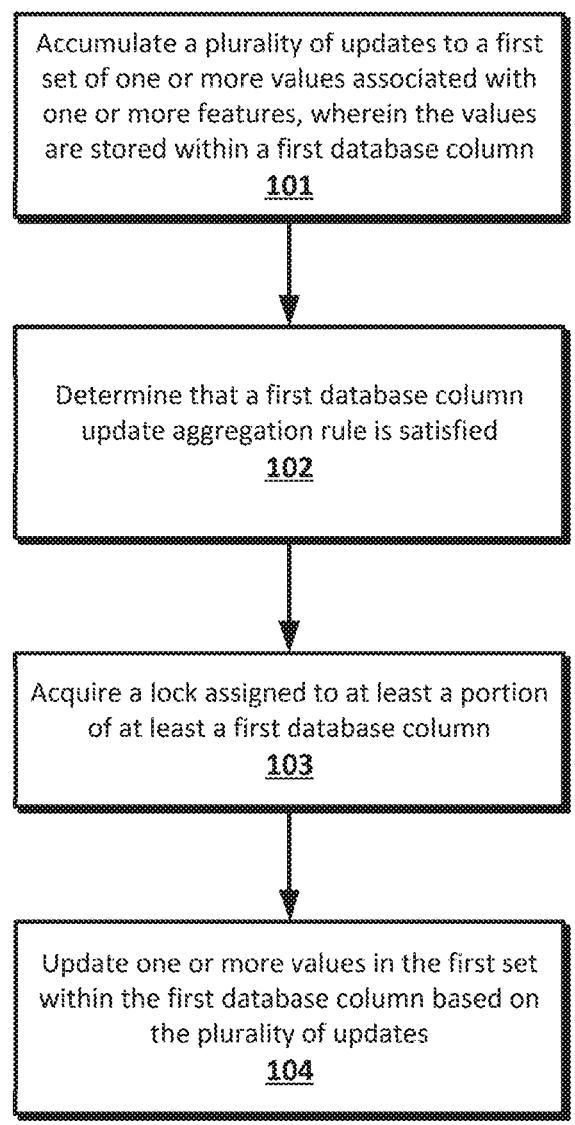
FIG. 1 shows an example process according to an implementation of the disclosed subject matter.

Large-scale data processing may include one or more databases that may store a vast number of datasets and values in each dataset. In large-scale data processing systems, periodic updates to the stored data may be needed. In order to access and/or update data, locks may be implemented in these databases and may be applied by a transaction to data in the database. A lock may block other transactions from accessing the same data during the transaction's life. In general, a lock may be a system object associated with a shared resource such as a data item of an elementary type, a row in a database, a column in a database, or a page of memory. In a database, a lock on a database object (a data-access lock) may need to be acquired by a transaction before accessing the object. Correct use of locks may prevent undesired, incorrect or inconsistent operations on shared resources by other concurrent transactions. When a database object with an existing lock acquired by one transaction needs to be accessed by another transaction, the existing lock for the object and the type of the intended access may be checked by the system. If the existing lock type does not allow this specific attempted concurrent access type, the transaction attempting access may be blocked (according to a predefined agreement/scheme). As an example, any single user may only be able to modify those database records (e.g., items in the database such as values in a dataset) to which they have acquired a lock that gives them exclusive access to the record until the lock is released. Locking not only provides exclusivity to writes but may also prevent (or control) reading of unfinished modifications, such as updates, to data in a database.

Implementations of the disclosed subject matter may be implemented in large-scale data processing systems in which relatively large amounts of data are stored and processed in a column-oriented database. A column-oriented database stores data tables as sections of columns of data rather than as rows of data. As discussed herein, this stored data may include values which may need to be updated periodically. In order to update a value, a lock must be acquired to prevent the data from being modified during the update. In some cases, one lock may be assigned to all the columns in a database; however, when all the columns are locked simply to update one value in one column, all system processing cores may be paused, which may prevent threads of data from proceeding through the system. In another case, a lock may be assigned to each of the stored values; however, this arrangement of assigning a lock with each value can be very expensive. In particular, locking is typically more expensive than accessing a numerical value from memory, and can dominate the overall cost of a transaction, such as a computation, if used indiscriminately. As a specific example, the cost of updating a value may be 15 nanoseconds, while the cost of acquiring a lock associated with the value may be 150 to 200 nanoseconds. Thus, the total cost for updating a value may range from 165 to 215 nanoseconds. When many stored values require updates, the cost of acquiring a lock dominates the overall computational cost and so it is highly desirable to ameliorate that cost. In computations where update operations do not have to be performed to stored values immediately, the present disclosure provides various locking techniques that may be applied to improve performance and lower overhead costs associated with acquiring locks.

In a column-oriented database, each column may store multiple data items such as data entries. Each data entry may comprise any type or format of data that is suitable for storage in a database. For example, a data entry may include text, numbers, symbols, images, values, documents, and the like. In a specific example, a data entry may include a field and a value associated with the field. A field may be a value identifier, a field entry, a feature, a category, an item, a topic, a file, or the like, with which the value is associated. As used herein, a value associated with a field may be an integer, a statistic, a probability, a weight, an average, or any other value that may be associated with a field.

The techniques described herein may be implemented in any system in which a lock may be used in a database. Large-scale data processing systems typically include one or more databases and use locks in these databases. A machine learning system is a specific example of a large-scale data processing system that includes a database as described herein. Machine learning systems are used to build a model or rule set to predict a result based on the values of a number of features. The machine learning involves use of a data set that typically includes, for each data entry, a value for each of a set of features, and a result. From this data set, a model or rule set for predicting a result may be developed. As such, a machine learning system may store and process data associated with features and values received by the system. A column-oriented database may be used in a machine learning system, in which case, each stored data entry may include a feature and a value associated with the feature. The machine may be trained to make predictions based on these features and associated values, both of which may be continuously received and stored in a machine learning system. A feature may correspond to an individual measurable heuristic property of a phenomenon that may be observed and may either be present or not present. As specific examples, a feature may be a specific demographic property such as age (e.g., a 24 year old user), gender (e.g., female), location (e.g., the United Kingdom), education (e.g., graduate degree), or the like; a user history property such as whether a specific link was selected, purchase history (e.g., a sweater bought from an online retailer), view history (e.g., a sweater recently viewed by the user), or the like; an association property such as an indication of whether a user is a member of a particular user group, whether a user is associated with a user account; the presence of a characteristic (e.g., keyword, a time associated with an action such as a when a purchase is made, etc.), or the like. In this case, a value associated with each of the features may be a number indicating the number of occurrences of the specific feature in the data received by the system, a weight indicating the frequency of the specific feature in the data received by the system, a statistic indicating the importance of a feature relative to other features in the data received by the system, and the like. As such, a machine learning system that includes a column-oriented database may store multiple features and a value associated with each feature.

As in the specific example of a machine learning system, updates to the values associated with features may be necessary as the value associated with each feature may change based on new data that continuously enters the system. These periodic updates to values stored in a column-oriented database in a large-scale data processing system may require the use of locks as described above.

Implementations of the disclosed subject matter provide methods and systems that allow for efficient locking of datasets in a column-oriented database by delaying updates to values in a dataset. One technique may be to accumulate multiple updates to multiple values. Once a database column update aggregation rule is satisfied, such as when a predefined number of updates have been accumulated, the values may be protected with an acquired lock, the updates may be performed to the multiple values, and the lock may be released. This technique allows for amortization of the cost of lock acquisition across multiple values in the database. Additionally, it allows for enough concurrency in the system to allow a number of threads of data to continue to proceed through the system and may keep all system processing cores busy.

According to an implementation, a system may include a processor configured to accumulate a multiple updates to a first set of one or more values associated with one or more features. The first set of one or more values may be stored within a first database column. It may be determined that a first database column update aggregation rule is satisfied. Next, a first lock assigned to at least a portion of at least a first database column may be acquired. As such, the one or more values in the first set within the first database column may be updated based on the plurality of updates.

FIG. 1 shows an example process according to an implementation of the disclosed subject matter. A method may include accumulating multiple updates to a first set of values associated with one or more features, at 101. The first set of values may be stored within a first database column. At 102, it may be determined that a first database column update aggregation rule is satisfied. For example, as new data enters the system, there may be a need to update a value stored in the database. Rather than update a value each time an update is needed, the updates may be accumulated until a predefined database column update aggregation rule is satisfied, at which point, all the accumulated updates may be made to the value. In some cases, this predefined database column update aggregation rule may be a database column update threshold. In general, database column update thresholds may be set individually for one or more columns, and/or one or more portions of one or more columns within a database. The individual thresholds may be selected by a user, predefined within a system, or determined algorithmically, such as based upon an observed or expected update rate for the particular column or column portion. The database column update aggregation rule may be based on a mechanism that occurs quickly without the use of a lock. For example, in a machine-learning system, each thread of received training examples may maintain its own received update queue and related aggregation rule. As a result, the aggregation rule may not be a concurrent data structure and may not require a lock. Alternatively, in some cases, an approximate aggregation rule may be used and may avoid the need to use locks associated with the aggregation rule.

A database column update aggregation rule may be based on a variety of update aggregation mechanisms. For example, an aggregation mechanism may allow for accumulation of multiple updates, either deterministically or randomly, prior to acquiring a lock and performing the accumulated updates. A database column update aggregation rule may be based on a variety of factors such as the specific features associated with the values, the type of values contained within a column, the frequency of updates to values in a column, and the like. A database column update aggregation rule may be based on a user setting, a system setting, a default setting, and the like. As an example, a database column update aggregation rule may be based on request for a number from a random number generator. The database column update aggregation rule may be satisfied when the returned number is less than a predefined value, for example, 1/10. As a result, the accumulated updates may be made to the values in a column. In some cases, a database column update aggregation rule may be defined according to a timer-based approach. For example, a database column update aggregation rule may be satisfied upon occurrence of a set number of clock cycles, for example, every 1000 clock cycles.

Additionally, a database column update aggregation rule may be a database column update threshold, that when exceeded, satisfies the database column update aggregation rule. In some cases, a database column update threshold may be a number of accumulated updates to a value or to multiple values. For example, the database column update aggregation rule may be satisfied when a threshold number of updates to the value associated with the feature "United States" are accumulated. For example, a database column threshold may be set to 10 updates for the feature "United States", and the threshold number of updates for values associated with the feature "video #357" may be set to 20 updates. In this case, the system may determine that the number of updates to the value associated with "United States" satisfies the database column update aggregation rule when 10 updates to the value have been accumulated. A similar determination may be made when the number of accumulated updates to the value associated with the feature "video #357" exceeds 20 updates. As another example, a threshold number of updates may be based on a particular column. For example, the threshold number of updates may be set to 125 updates for values stored in a particular portion of a column. In this case, the database column update aggregation rule may be satisfied when the total number of accumulated updates to values in the particular portion of the column exceeds 125 updates. In general, database column update thresholds may be set individually for one or more columns, and/or one or more portions of one or more columns within a database. The individual database update thresholds may be selected by a user, predefined within a system, or determined algorithmically, such as based upon an observed or expected update rate for the particular column or column portion.

Once a determination has been made that the database column update aggregation rule has been satisfied, a lock may be acquired. At 103, a first lock assigned to at least a portion of at least a first database column may be acquired. The one or more values in the first set within the first database column may be updated based on the multiple updates, at 104. In an implementation, updates may be accumulated for multiple sets of values in a database and a lock associated with each set of values may be acquired when the database column update aggregation rule is satisfied. For example, multiple updates to a second set of one or more values associated with one or more features may be accumulated. The second set of one or more values may be stored within a second database column. Next, it may be determined that the number of updates satisfies a second database column update aggregation rule. A second lock associated with at least a portion of the second database column may be acquired. As a result, the one or more values in the second set within the second database column may be updated based on the plurality of updates. In an implementation, the second set of one or more values may be associated with the second lock.

Figure 2:
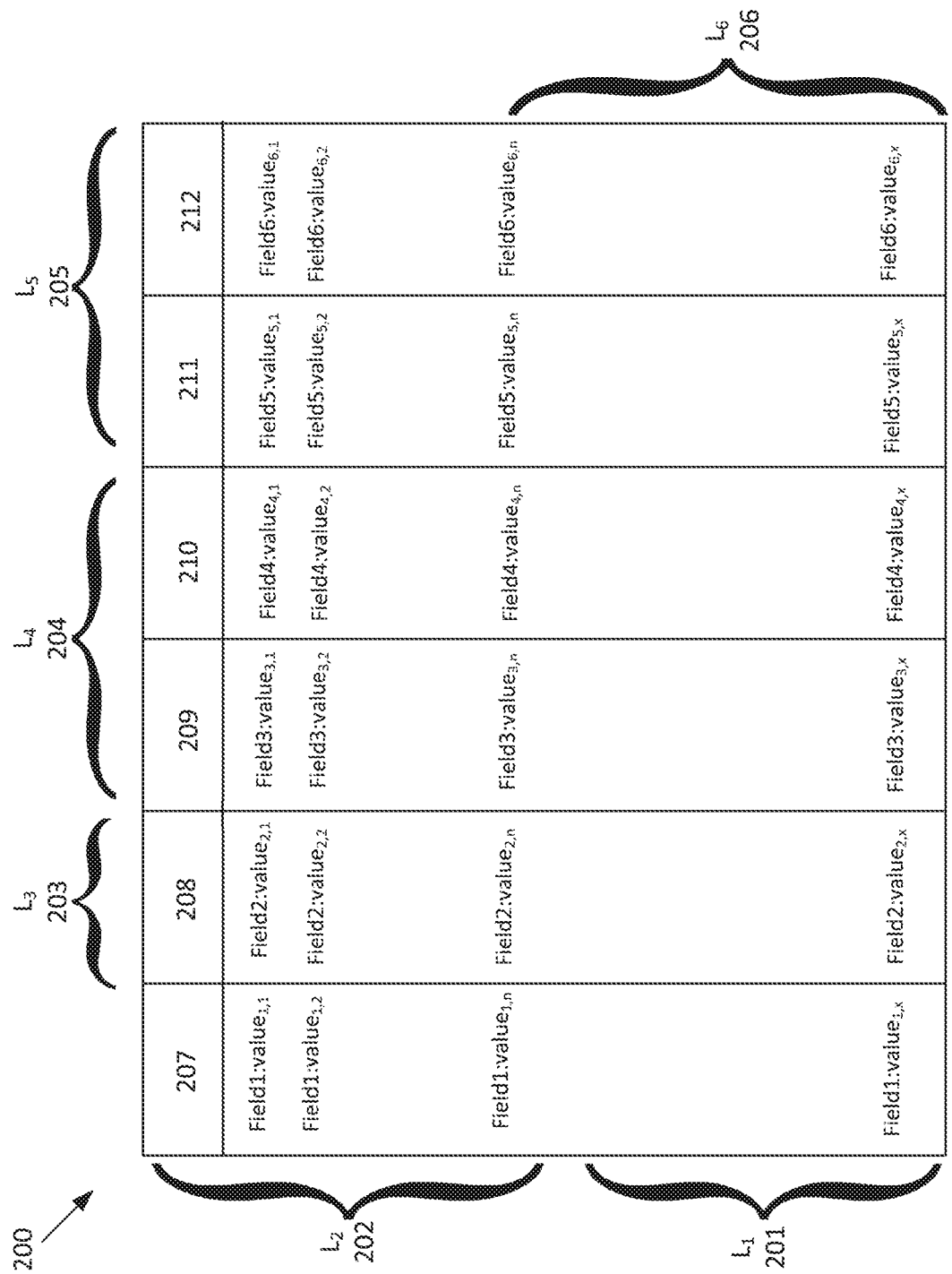
FIG. 2 shows an example database arrangement according to an implementation of the disclosed subject matter.

FIG. 2 shows an example database arrangement according to implementations of the disclosed subject matter. As shown, a column-oriented database 200 may store data tables as sections of columns of data 207, 208, 209, 210, 211, and 212. Each column may include multiple entries, and each entry may include, for example, a field entry indicating a feature, and a value associated with the feature. As shown, each column 207, 208, 209, 210, 211, and 212 may include x number of entries, each entry including a feature and a value. Examples of entries may be French:9874, female: 23499, Canada:23908, United States:59712, Age 18-35: 3672, and the like. As specific examples, column 207 may include the entries Canada:23908, United States:59712, Germany:70938, and Japan:2240. Column 208 may include the entries English:3, Hindi:5, Spanish:4, and Italian:2. Column 209 may include the entries female:4, male:4; and unknown:1. Column 212 may include the entries age 12-18: 0.2, age 19-25:0.4, age 26-35:0.5, and age 35+:0.2. Although not described in detail, columns 210 and 211 may also include entries comprising a feature and a value associated with the feature.

A database may include one or more locks (L) 201, 202, 203, 204, 205, and 206, and each lock may be assigned to one or more columns and/or one or more portions of a column according to various arrangements. For example, a lock 205 may be assigned to at least a portion of column 211 and the same lock 205 may be assigned to a portion of a second database column 212, a lock 204 may be assigned to multiple database columns 209, 210. In some cases, a lock, such as locks 201 and 202, may be assigned to only a portion of a database column 207, or a lock 203 may be assigned only to one entire database column 208. For purposes of this example provided in FIG. 2, the database column update aggregation rule may be a database column update threshold, the when exceeded, satisfies the database column update aggregation rule. Based on the various lock and column arrangements, updates to the values stored in columns 207, 208, 209, 210, 211, and 212 may be accumulated and a determination may be made that a database column update threshold has been exceeded for values in a column. As a result, an associated lock 201, 202, 203, 204, 205, or 206 may be acquired, and the values associated with the acquired lock may be updated based on the accumulated updates.

According to an implementation, a lock may be associated with one entire column, such as lock 203 assigned to column 208. In this arrangement, only the values stored in column 208 are associated with lock 203. Multiple updates to the values English:3, Hindi:5, Spanish:4, and Italian:2 in column 208 may be accumulated. It may be determined that number of updates to these values in column 208 exceeds a database column update threshold. For example, the database column update threshold for column 208 may be 8 updates. The multiple updates to the values in column 208 may be for one particular value, for example, there may be 8 updates to the value 3 associated with the feature English. Alternatively, the multiple updates to the values in column 208 may be for multiple values, such as 3 updates to the value 3 associated with English, 2 updates to the value 5 associated with Hindi, and 3 updates to the value 4 associated with Spanish. Once it has been determined that the database column update threshold for column 208 has been exceeded, lock 203 may be acquired, and the values in column 208 may be updated based on the multiple accumulated updates. Although not shown in FIG. 2, this technique of assigning one lock per column may be implemented for each column in the database. This may allow for sufficient concurrency in the data processing system since only one column is locked while values in that column are being updated, in the meantime, the other columns in the system may continue to be accessed for continuous processing.

In some cases, a lock may be assigned to more than one column. This technique may be useful for values that are not updated frequently. For example, lock 204 may be assigned to both columns 209 and 210. It may be the case that the values stored in columns 209 and 210 are updated infrequently, as such, it may be sufficient to assign one lock 204 to both columns. For example, column 209 may include the entries female:4, male:4; and unknown:1. Multiple updates to these values may be accumulated and once it has been determined that the database column update threshold has been exceeded, lock 204 may be acquired. When lock 204 is acquired, access to all of the values in both columns 209 and 210 may be blocked while the values in the entries female:4, male:4; and unknown:1 are being updated.

As mentioned previously, a database column update aggregation rule may be a database column update threshold. A database column update threshold may be based on a variety of factors. For example, the database column update threshold may be based on the type of values associated with particular features. For example, column 212 may include the entries age 12-18:0.2, age 19-25:0.4, age 26-35:0.5, and age 35+:0.2. Each of the values associated with the features age 12-18, age 19-25, age 26-35, and age 35+ may be a statistic associated with the age group. Because these statistics may not change often, updates to these values may occur infrequently. However, these statistics may be more important (e.g., to a system processing the data in the database) relative to other values stored in the database. In this case, these values may be stored in a portion of column 212 which may be assigned exclusively to lock 206. As such, other entries stored in column 212 may be associated with lock 205. Alternatively, all of the entries including more important statistics may not be stored in the same column. In which case, each of the entries may be associated with lock 206 and each may be updated when lock 206 is acquired.

Another technique may be to select a set number of locks (e.g., 6) in a database, and associate each stored value to one of the locks 201, 202, 203, 204, 205, and 206 in a way that distributes memory accesses uniformly across the locks 201, 202, 203, 204, 205, and 206. This may be performed by random assignment of values to locks, or based on information about the distribution of memory access. For example, values that are more frequently updated may be associated with the one lock while less frequently updated values may be associated with another lock. Although not shown in FIG. 2, these frequently updated values may or may not be stored in the same column. By associating each of these frequently updated values to the same lock, locking may be performed in a manner that takes advantage of the distribution of memory access and may allow for continuous access to other less frequently updated values. Alternatively, each of the values that are more frequently updated may be assigned to a particular lock such that frequently updated values are distributed across locks to avoid lock contention.

According to an implementation, the techniques for assigning one or more locks to one or more columns described herein may be combined. For example, if the number of columns is small in a system such that each column is accessed frequently to update values, or if one of the columns is more frequently accessed in relation to other columns in the system, the contention for a lock in these cases may be overcome by assigning multiple locks to one column. In this arrangement, multiple locks may be associated with one column and values in the column may be assigned to each of the multiple locks in a way that distributes memory access uniformly. As shown in FIG. 2, lock 201 may be associated with a first portion of column 207 and lock 202 may be associated with a second portion of column 207. The entries Canada:23908 and United States:59712 may be stored in the first portion of column 207 and the entries Germany:70938, and Japan:2240 may be stored in the second portion of column 207. Updates to the values in the entries Canada:23908 and United States:59712 may be accumulated. In this case, a database column update aggregation rule may be an update threshold. For example, it may be determined that the column update aggregation rule has been satisfied when the number of accumulated updates exceeds the update threshold. In this case, for example, the update threshold may be set to 26 updates. Once it has been determined that the database column update threshold (i.e., 26 updates) for these values has been exceeded, the lock 201 may be acquired and the values for which there is an update may be updated. For example, all 26 updates may be to the value 23908 associated with Canada, or there may be 12 updates to the value 23908 associated with Canada and 14 updates to 59712 associated with United States. Similarly, updates to the values Germany:70938 and Japan:2240 associated with the second portion of column 207 may be accumulated. Once it has been determined that the database column update threshold for the values stored in the second portion of column 207 has been exceeded, the lock 202 may be acquired and the values for which there is an update may be updated. In this arrangement, the lock 201 may be acquired independent of the lock 202. Additionally, when one of the locks is acquired, the values associated with the other lock may continue to be accessed by the system for processing. For example, when lock 201 is acquired and the values in Canada:23908 and United States:59712 are being updated, the values in Germany:70938 and Japan:2240 may remain accessible and unlocked.

In an implementation, communication between a database and an update provider may be across one or more bridges between the systems. For example, the communications between a database and an update provider may be managed or assisted by a third device, such as, a coordinating device, a local coordinator, a remote server, etc. In such cases, the third device may, for example, accumulate multiple updates to values from an update provider. The third device may then determine that the database column update aggregation rule has been satisfied, in which case, the third device may update the values in the database based on the multiple updates. Alternatively, the third device may provide the multiple updates to the database upon receiving an indication from the update provider that the database column update aggregation rule has been satisfied. Furthermore, more than one intermediate device may be implemented to facilitate communication between a database and an update provider.

Figure 3:
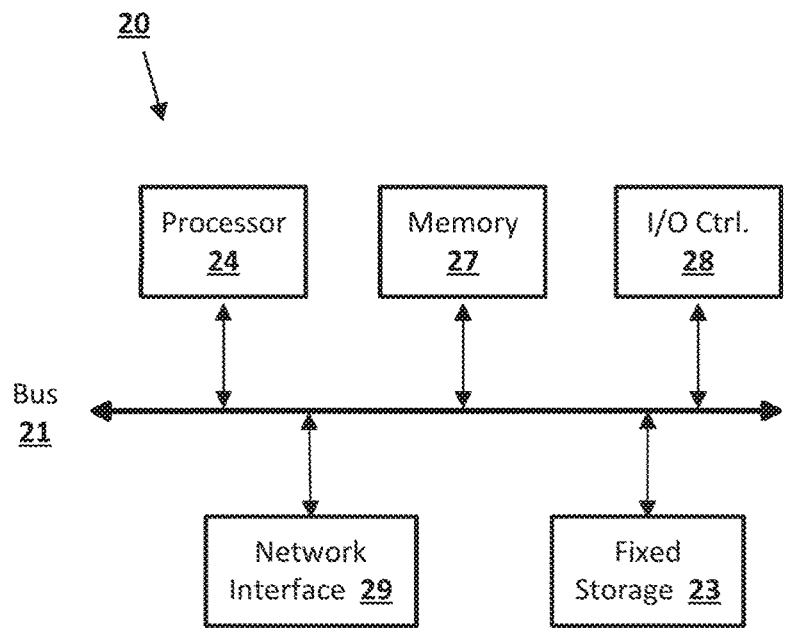
FIG. 3 shows a computer according to an embodiment of the disclosed subject matter.

Embodiments of the presently disclosed subject matter may be implemented in and used with a variety of component and network architectures. FIG. 3 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 4.

Many other devices or components (not shown) may be connected in a similar manner, such as document scanners, digital cameras, auxiliary, supplemental, or backup systems, or the like. Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 4:
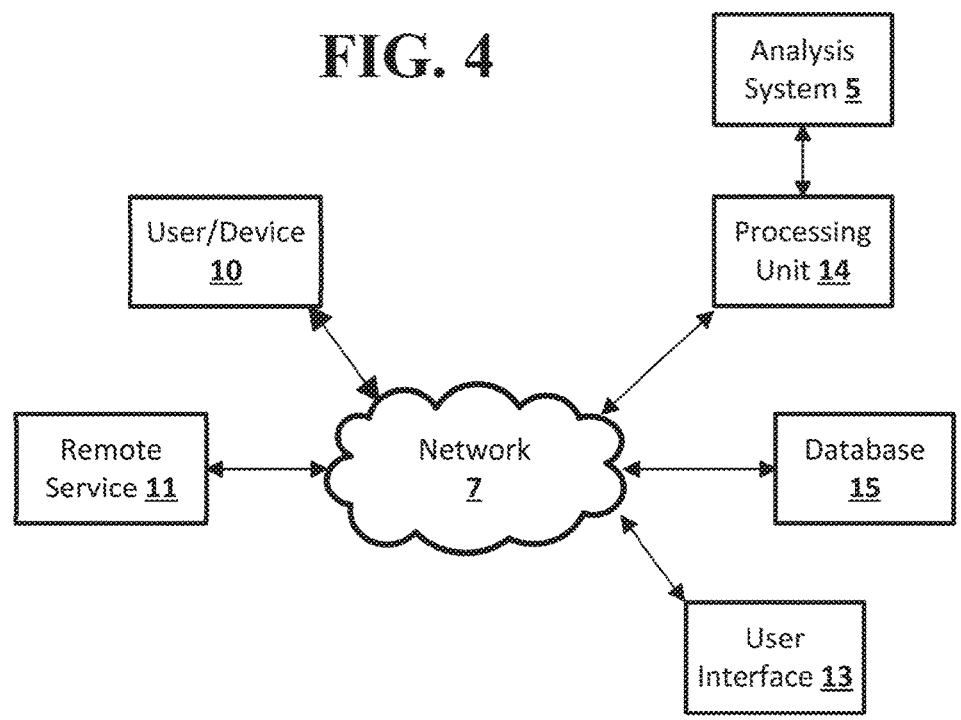
FIG. 4 shows a network configuration according to an embodiment of the disclosed subject matter.

FIG. 4 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for updating a database that includes a plurality of database columns that each include a plurality of entries, each entry storing a respective field and value, the method comprising:
associating exactly one lock of a plurality of locks with each entry of the plurality of entries, wherein each lock is associated with one or more entries and each entry is associated with exactly one lock, wherein the database has a distribution of memory accesses in which some entries are updated more frequently than other entries, and wherein memory accesses made according to the distribution to the values of entries are uniformly distributed over the locks;
associating a respective update aggregation rule to each lock of the plurality of locks; and for each lock:
accumulating a plurality of updates to the database entries associated with the lock until the update aggregation rule associated with the lock is satisfied, wherein application of the accumulated updates to the database entries associated with the lock is delayed until the update aggregation rule associated with the lock is satisfied, and then
acquiring the lock and updating the database by applying the accumulated plurality of updates to the entries associated with the lock,
wherein the update aggregation rules comprise a first rule that is satisfied when (i) a predefined number of updates have been made to database entries associated with the lock, (ii) a predefined number of updates have been made to values associated with a particular feature associated with the lock, (iii) a predetermined amount of time has passed, or (iv) a generated random number satisfies a condition of being greater than or less than a predetermined threshold value.

2. The computer-implemented method of claim 1, further comprises: assigning, according to a uniform random distribution, each lock of the plurality of locks to one or more entries of the plurality of entries.

3. The computer-implemented method of claim 1, further comprises: assigning each lock of the plurality of locks to one or more entries of the plurality of entries based on information describing a distribution of memory accesses.

4. The computer-implemented method of claim 1, wherein the respective update aggregation rule associated with each respective lock is satisfied when a number of accumulated updates to the one or more entries associated with the lock satisfies a predetermined threshold number of updates.

5. The computer-implemented method of claim 4, wherein the threshold number of updates for at least one of the update aggregation rules is determined based on an update rate for the one or more entries associated with each lock associated with the at least one of the aggregation rules.

6. The computer-implemented method of claim 4, wherein the threshold number of updates is based on a type of value associated with particular features of one or more entries associated with the lock.

7. A system for updating a database that includes a plurality of database columns that each include a plurality of entries, each entry storing a respective field and value, comprising:
one or more computers and one or more storage devices storing instructions that are operable, when executed by the one or more computers, to cause the one or more computers to perform operations comprising:
associating exactly one lock of a plurality of locks with each entry of the plurality of entries, wherein each lock is associated with one or more entries and each entry is associated with exactly one lock, wherein the database has a distribution of memory accesses in which some entries are updated more frequently than other entries, and wherein memory accesses made according to the distribution to the values of entries are uniformly distributed over the locks;
associating a respective update aggregation rule to each lock of the plurality of locks; and for each lock:
accumulating a plurality of updates to the database entries associated with the lock until the update aggregation rule associated with the lock is satisfied wherein application of the accumulated updates to the database entries associated with the lock is delayed until the update aggregation rule associated with the lock is satisfied, and then
acquiring the lock and updating the database by applying the accumulated plurality of updates to the entries associated with the lock,
wherein the update aggregation rules comprise a first rule that is satisfied when (i) a predefined number of updates have been made to database entries associated with the lock, (ii) a predefined number of updates have been made to values associated with a particular feature associated with the lock, (iii) a predetermined amount of time has passed, or (iv) a generated random number satisfies a condition of being greater than or less than a predetermined threshold value.

8. The system of claim 7, further comprises:
assigning, according to a uniform random distribution, each lock of the plurality of locks to one or more entries of the plurality of entries.

9. The system of claim 7, further comprises:
assigning each lock of the plurality of locks to one or more entries of the plurality of entries based on information describing a distribution of memory accesses.

10. The system of claim 7, wherein the respective update aggregation rule associated with each respective lock is satisfied when a number of accumulated updates to the one or more entries associated with the lock satisfies a predetermined threshold number of updates.

11. The system of claim 10, wherein the threshold number of updates for at least one of the update aggregation rules is determined based on an update rate for the one or more entries associated with each lock associated with the at least one of the aggregation rules.

12. The system of claim 10, wherein the threshold number of updates is based on a type of value associated with particular features of one or more entries associated with the lock.

13. The system of claim 7, wherein the update aggregation rule associated with the lock is satisfied after a predetermined amount of execution time.

14. A non-transitory computer-readable medium storing software comprising instructions executable by one or more computers which, upon such execution, cause the one or more computers to perform operations for updating a database that includes a plurality of database columns that each include a plurality of entries, each entry storing a respective field and value comprising:

associating exactly one lock of a plurality of locks with each entry of the plurality of entries, wherein each lock is associated with one or more entries and each entry is associated with exactly one lock, wherein the database has a distribution of memory accesses in which some entries are updated more frequently than other entries, and wherein memory accesses made according to the distribution to the values of entries are uniformly distributed over the locks;

associating a respective update aggregation rule to each lock of the plurality of locks; and for each lock:
    accumulating a plurality of updates to the database entries associated with the lock until the update aggregation rule associated with the lock is satisfied wherein application of the accumulated updates to the database entries associated with the lock is delayed until the update aggregation rule associated with the lock is satisfied, and then acquiring the lock and updating the database by applying the accumulated plurality of updates to the entries associated with the lock, wherein the update aggregation rules comprise a first rule that is satisfied when (i) a predefined number of updates have been made to database entries associated with the lock, (ii) a predefined number of updates have been made to values associated with a particular feature associated with the lock, (iii) a predetermined amount of time has passed, or (iv) a generated random number satisfies a condition of being greater than or less than a predetermined threshold value.

15. The computer-readable medium of claim 14, the operations further comprising:
    assigning, according to a uniform random distribution, each lock of the plurality of locks to one or more entries of the plurality of entries.

16. The computer-readable medium of claim 14, the operations further comprising:
    assigning each lock of the plurality of locks to one or more entries of the plurality of entries based on information describing a distribution of memory accesses.

17. The computer-readable medium of claim 14, wherein the respective update aggregation rule associated with each respective lock is satisfied when a number of accumulated updates to the one or more entries associated with the lock satisfies a predetermined threshold number of updates.

18. The computer-readable medium of claim 17, wherein the threshold number of updates for at least one of the update aggregation rules is determined based on an update rate for the one or more entries associated with each lock associated with the at least one aggregation rules.

19. The computer-readable medium of claim 17, wherein the threshold number of updates is based on a type of value associated with particular features of one or more entries associated with the lock.

20. The computer-readable medium of claim 14, wherein the update aggregation rule associated with the lock is satisfied after a predetermined amount of execution time.

\* \* \* \* \*